United States Patent [19]

Typaldos et al.

[11] Patent Number: 6,145,103
[45] Date of Patent: Nov. 7, 2000

[54] EMULATOR SUPPORT MODE FOR DISABLING AND RECONFIGURING TIMEOUTS OF A WATCHDOG TIMER

[75] Inventors: Melanie D. Typaldos, Buda; Patrick E. Maupin, Austin, both of Tex.

[73] Assignee: Advanced Micro Devices, Inc., Sunnyvale, Calif.

[21] Appl. No.: 09/056,509

[22] Filed: Apr. 7, 1998

[51] Int. Cl.[7] .................................................. S06F 11/00
[52] U.S. Cl. .................................... 714/55; 395/500.49
[58] Field of Search ................................ 714/55, 56, 48, 714/25, 27, 28, 29, 30, 31, 35, 39, 45, 47; 364/282.8, 267.9; 395/575, 500.05, 500.44, 500.45, 500.49, 500.07

[56] References Cited

U.S. PATENT DOCUMENTS

| | | | |
|---|---|---|---|
| 4,099,255 | 7/1978 | Stanley et al. | 364/900 |
| 4,998,197 | 3/1991 | Kurakazu et al. | 364/200 |
| 5,084,814 | 1/1992 | Vaglica et al. | 395/325 |
| 5,233,613 | 8/1993 | Allen et al. | 371/16.3 |
| 5,493,659 | 2/1996 | Kurakau et al. | 395/375 |
| 5,511,209 | 4/1996 | Mensch, Jr. | 395/800 |
| 5,541,943 | 7/1996 | Niescier et al. | 371/6 |
| 5,644,703 | 7/1997 | Kurakazu et al. | 395/183.11 |
| 5,790,833 | 8/1998 | Gulick et al. | 395/500 |

OTHER PUBLICATIONS

Am186™Er and Am188™Er, Chapter 8, Watchdog Timer, © 1998 Advanced Micro Devices, Inc.
Am186™Es and Am188™Es, Advanced Micro Devices, Jan. 1996, Publication #20002.
Am186™ED/EDLV, Advanced Micro Devices, May 1997, Publication #21336.
*Microchip PIC16/17 Microcontroller Data Book,* Microchip Technology, Inc., May 1995, pp. ii, 2–825, 2–921, 2–925, 2–926, 2–929, and 2–936.

*Primary Examiner*—Nadeem Iqbal
*Attorney, Agent, or Firm*—Akin, Gump, Strauss, Hauer & Feld, LLP

[57] ABSTRACT

A microcontroller-based device according to the present invention provides a watchdog timer having an emulator support mode for disabling and reconfiguring time-outs. When the watchdog timer is placed in the emulator support mode, the watchdog timer is inhibited from counting. In a disclosed embodiment, the watchdog timer is inhibited from counting by deasserting a count enable signal. A watchdog time-out is thus prevented from occurring during the emulator support mode. Also, during the emulator support mode, the watchdog timer control register is writable, allowing the emulator to disable a watchdog timer, enable the timer, or program a new time-out value for the timer. The watchdog timer control register is writable regardless of the state of the enable bit of the timer. Further, in the emulator support mode, a watchdog timer current count becomes readable and writable at a predetermined register address above the watchdog timer control register subsequent to a write of a write key sequence to the watchdog timer control register. By writing and reading the predetermined register address location, the emulator is able to define and monitor a condition as the watchdog timer is approaching its timeout value. By monitoring a condition as the watchdog timer approaches its timeout value, a software debugger may better predict and appreciate the behavior of a microcontroller-based device prior to a watchdog time-out. In a disclosed embodiment, the watchdog timer current count is readable and writable through a watchdog timer count high register and a watchdog timer count low register.

23 Claims, 2 Drawing Sheets

EMULATOR SUPPORT MODE FOR DISABLING AND RECONFIGURING TIMEOUTS OF A WATCHDOG TIMER

BACKGROUND OF THE INVENTION

1. Field of the Invention

The present invention relates to emulator support for microcontrollers, and more particularly to an emulator support mode for disabling and reconfiguring time-outs of a watchdog timer.

2. Description of the Related Art

A traditional method of debugging an embedded system or other microcontroller-based device is to use an in-circuit emulator. An in-circuit emulator is primarily used in addressing problems such as signal synchronization, clock frequency, and trace bandwidth. To facilitate in-circuit emulation of code in a microcontroller-based device, breakpoints are commonly set throughout user or application code to be executed on the microcontroller. At each breakpoint, emulator code takes over and is run on the microcontroller in the place of user code. For numerous applications, a watchdog timer is enabled during code execution. Once enabled, a watchdog timer becomes read-only and may not be disabled or reconfigured. After the programmed time-out period, the watchdog timer generates a watchdog time-out unless the timer is refreshed or reset. A watchdog time-out event is an event indicating that software is behaving in a faulty and unexpected way. The occurrence of a watchdog time-out which indicates that a watchdog time-out event has occurred desirably generates a non-maskable interrupt or a reset of the microcontroller or the microcontroller-based device as recovery from the software malfunction. The occurrence of a watchdog time-out which does not indicate that a watchdog time-out event has occurred, however, disrupts code execution. A watchdog time-out is particularly undesirable during an emulation mode of a microcontroller-based device since the state of the device during an emulation mode is ill-suited to processing a watchdog time-out.

Conventional watchdog timers have required repetitive and periodic refreshing during watchdog timer code execution and emulator code execution to prevent a watchdog time-out. During watchdog timer code execution, each refresh of the watchdog timer has been performed by watchdog timer code, and during execution of emulator code, each refresh of a watchdog timer has been performed by the emulator. Generating invasive resets of a watchdog timer within emulator code at each of the appropriate times has been highly difficult. The use of emulators for the debug of watchdog timer code has thus been correspondingly difficult.

Emulator code is designed to interact with watchdog timer code such that following a breakpoint, the user is unable to determine when emulator code is being executed and when watchdog timer code is being executed. Refreshing of a watchdog timer by emulator code undesirably masks to the user whether the watchdog timer code is refreshing the watchdog timer with sufficient frequency to prevent a watchdog time-out. The resets to the watchdog timer defined within the watchdog timer code may not occur or may occur prematurely depending on the location of breakpoints within the watchdog timer code and the duration of the execution of emulator code following the breakpoints.

In an effort to predict how a microcontroller-based device may behave prior to a watchdog time-out, a user has typically set a watchdog timer for a short time-out period and then observed the effect upon the device. The user then extrapolates that effect in an attempt to predict how the device might react prior to the watchdog time-out. This approach yields significant inaccuracies that pose a high degree of software debug uncertainty.

SUMMARY OF THE INVENTION

Briefly, a microcontroller-based device according to the present invention provides a watchdog timer having an emulator support mode for disabling and reconfiguring time-outs. When the watchdog timer is placed in the emulator support mode, the watchdog timer is inhibited from counting. In a disclosed embodiment, the watchdog timer is inhibited from counting by deasserting a count enable signal. A watchdog time-out is thus prevented from occurring during the emulator support mode.

Also, during the emulator support mode, a watchdog timer control register is writable, allowing the emulator to disable the watchdog timer, enable the timer, or program a new time-out value for the timer. The watchdog timer control register is writable regardless of the state of the enable bit of the timer.

Further, in the emulator support mode, a watchdog timer current count becomes readable and writable at a predetermined register address above the watchdog timer control register subsequent to a write of a write key to the watchdog timer control register. By writing and reading the predetermined register address location, the emulator is able to define and monitor a condition as the watchdog timer is approaching its time-out value.

By monitoring a condition as the watchdog timer approaches its time-out value, a software debugger may better predict and appreciate the behavior of a microcontroller-based device prior to a watchdog time-out. In a disclosed embodiment, the watchdog timer current count is readable and writable through a watchdog timer count high register and a watchdog timer count low register.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
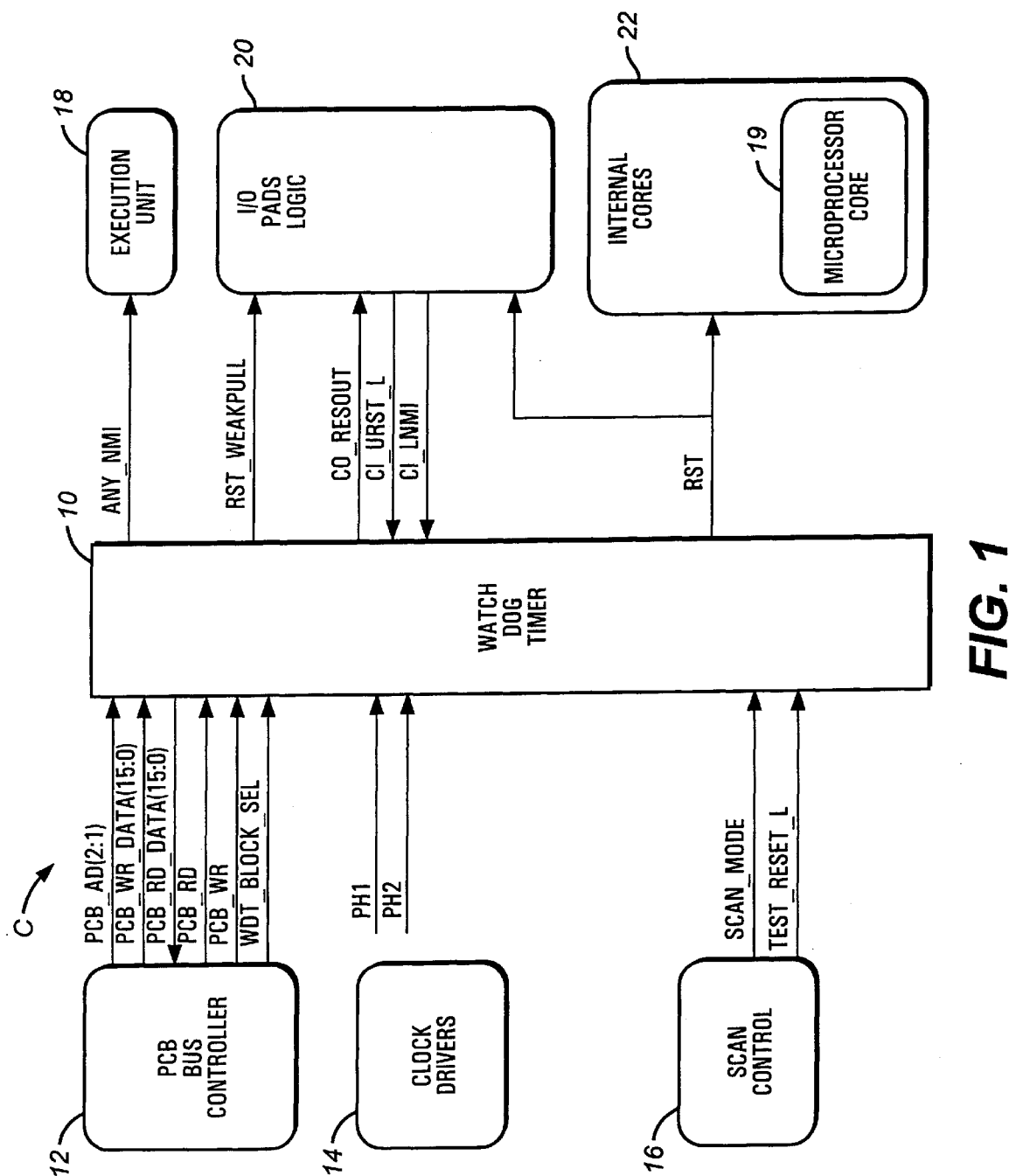
FIG. 1 is a block diagram of a microcontroller including a watchdog timer core and associated cores in accordance with the present invention.

Turning now to the drawings, FIG. 1 depicts a block diagram of a microcontroller C including a watchdog timer 10 of the present invention. The microcontroller C may be used to provide a variety of control functions for a processor-based device. The watchdog timer 10 is used to regain control of the processor-based device if software run by the microcontroller C fails to respond or behave as expected. When the watchdog timer 10 is active, a repetitive software function is required to access the timer 10 and reset the timer 10 at a rate that is faster than the time-out value of the timer 10. If the timer 10 is not reset before the duration of the watchdog timer time-out interval, the timer 10 generates a reset of the microcontroller C, a reset of the processor-based device, or a non-maskable interrupt (NMI). A reset of the processor-based device is provided as a RST signal by the timer 10 to various internal cores 22 of the microcontroller C. Examples of internal cores 22 which may receive the RST signal include a DMA controller, a microprocessor core 19, timers, counters, an interrupt controller, a universal serial bus (USB) controller, a bus interface unit, an execution unit 18, a chip-select unit, a peripheral control block (PCB) bus controller 12, and miscellaneous logic. The RST signal is also provided to I/O pads logic 20 to latch the state of various input pins of the microcontroller C when an externally generated reset occurs. If a watchdog timer NMI event occurs rather than a reset, then the timer 10 provides an ANY_NMI signal to the execution unit 18.

Various signals are provided between the watchdog timer 10 and the I/O pads logic 20. The watchdog timer 10 provides a RST_WEAKPULL signal and a CO_RESOUT signal to the I/O pads logic 20. The RST_WEAKPULL signal is asserted when either a CI_URST_L signal is asserted or the RST signal is asserted. The RST_WEAKPULL signal is used by the I/O pads logic 20 to enable a pull-up at an I/O pad 21. A pull-up ensures that an input path is properly terminated during an externally generated reset or a reset due to a watchdog timer time-out. The RST_WEAKPULL signal may also be used to enable a pull-down termination in an I/O pad 21. The CI_URST_L signal is provided by the I/O pads logic 20 to the watchdog timer 10. This signal is asserted in response to an externally generated reset. A CI_LNMI signal is also provided by the I/O pads logic 20 to the watchdog timer 10. The CI_LNMI signal is driven from the external NMI pin and is ORed together with the time-out NMI source to generate the ANY_NMI output signal. During a watchdog timer reset, the CO_RESOUT signal is held for multiple cycles to provide a signal of sufficient duration to ensure reset of various components which may exist on a board housing the watchdog timer 10.

The input signals provided by the PCB bus controller 12 to the watchdog timer 10 include a PCB_AD signal, a PCB_WR_DATA signal, a PCB_RD signal, a PCB_WR signal, and a WDT_BLOCK_SEL signal. In the disclosed embodiment, the PCB_AD signal consists of 2 bits, and the PCB_WR_DATA signal consists of 16 bits. The PCB_AD signal represents a PCB address bus used in conjunction with the WDT_BLOCK_SEL signal to decode accesses to registers in the watchdog timer 10. The PCB_WR_DATA signal represents a PCB write data bus containing data to be written to PCB registers in the watchdog timer 10. The PCB_RD signal indicates a read cycle from the PCB bus controller 12, and the PCB_WR signal indicates a write cycle from the PCB bus controller 12. The WDT_BLOCK_SEL signal is used to select PCB registers in the timer 10. The PCB_RD_DATA signal provided by the timer 10 to the PCB bus controller 12 represents a PCB read data bus containing data read from the PCB registers in the timer 10. In the disclosed embodiment, the PCB_RD_DATA signal consists of 16 bits.

The clock drivers 14 and scan control core 16 also provide signals to the watchdog timer 10. The clock drivers 14 provide a PH1 signal representing one system clock and a PH2 signal representing a second system clock. The scan control core 16 provides a SCAN_MODE signal for enabling a scan mode. Use and operation of a scan mode is known in the art. The scan control core 16 also provides a TEST_RESET_L signal that is multiplexed with the RST signal for resetting scan blocks. A table including each of the signals discussed above is provided below:

| Signal Name | Description |
| --- | --- |
| PCB_AD(2:1) | PCB address bus from the PCB bus controller used in conjunction with the WDT_BLOCK_SEL input to decode the WDT register accesses. |
| PCB_WR_DATA(15:0) | PCB Write Data bus contains the data to be written to the PCB registers. |
| PCB_RD_DATA(15:0) | PCB Read Data bus contains the data read from the PCB registers. |
| PCB_RD | PCB read indicates a read cycle from the PCB bus controller. |
| PCB_WR | PCB write indicates a write cycle from the PCB bus controller. |
| WDT_BLOCK_SEL | Select for WDT block PCB registers. |
| PH1 | PH1 one system clock. |
| PH2 | PH2 two system clock. |
| ANY_NMI | Non-maskable interrupt indication to the execution unit. This signal is asserted as a result of the watchdog timer NMI event or when the CI_LNMI input is asserted. |
| CI_LNMI | External NMI request from the I/O pad logic. Asserted when an external NMI is asserted high and synchronized. |
| CI_URST_L | Externally generate Reset input from the Reset I/O PAD logic. |
| RST_WEAKPULL | Reset Pull Up Control. This signal is used to enable the weak pullups and pulldowns in the pads. |
| RST | This is the primary reset for all internal cores. RST is asserted when CI_URST_L (external reset) is asserted or when a WDT reset event occurs. |
| CO_RESOUT | This the external reset signal provided by the part to the board. |
| SCAN_MODE | Scan mode enable. |
| TEST_RESET_L | The WDT muxes the value of TEST_RESET_L with RST to allow for a reset of the scan blocks. |

It should be understood that the microcontroller C may integrate a variety of functions in addition to the functions of the watchdog timer 10. These other functions may for example include interrupt control, DMA control, synchronous serial port control, bus control, memory control, peripheral control, programmable I/O control, address control, and clock control. A wide variety of microcontrollers could be used instead of the disclosed microcontroller C without detracting from the spirit of the invention. Further, although the term microcontroller is sometimes used to denote a processor with memory implemented on a single integrated circuit, here the term more broadly includes embedded controllers, microprocessors, digital signal processors (DSPs) and the like.

Figure 2:
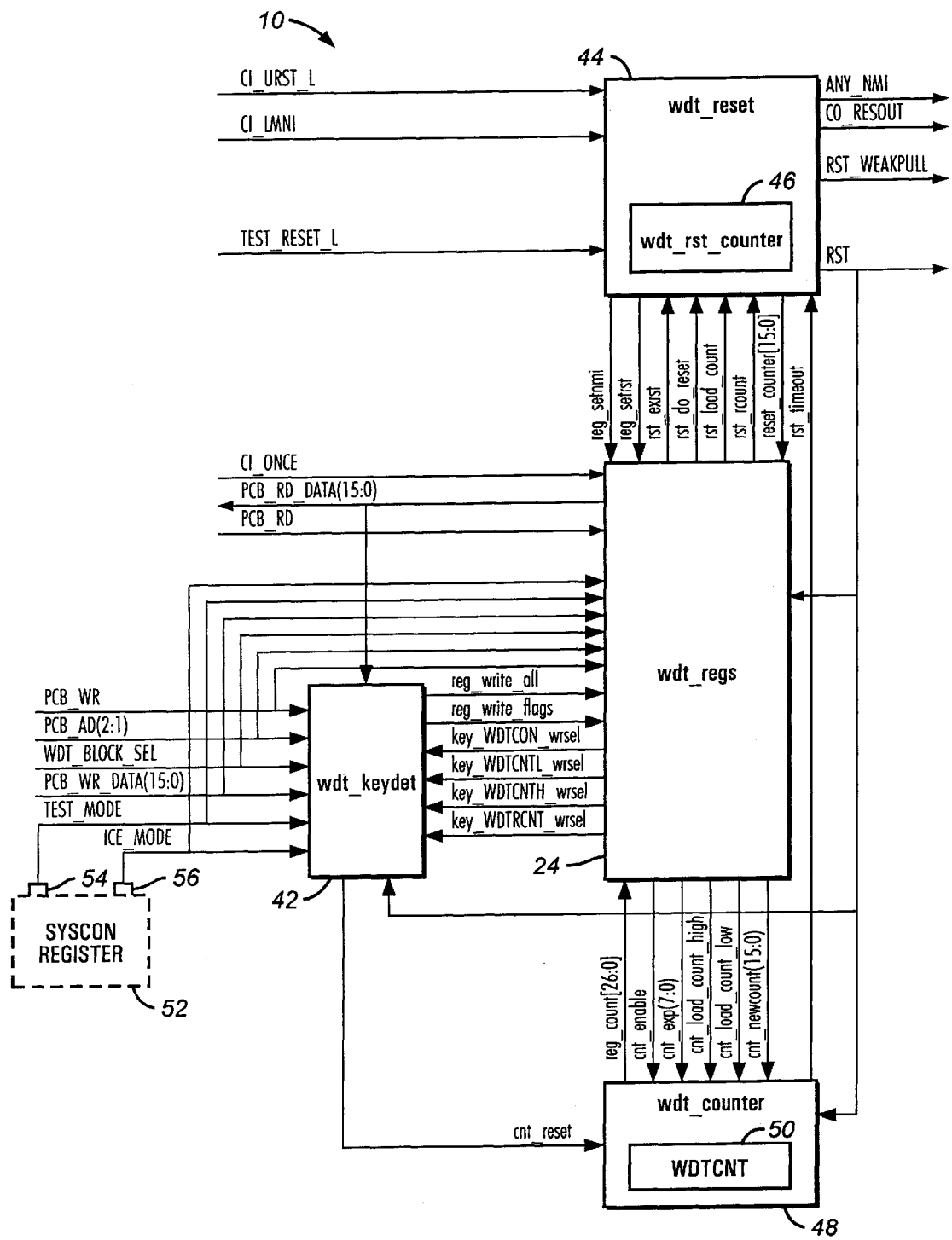
FIG. 2 is a schematic diagram of the watchdog timer core of FIG. 1.

Turning to FIG. 2, a schematic diagram of the watchdog timer 10 is shown. The watchdog timer 10 includes a key detect block wdt_keydet 42, a register control block wdt_regs 24, a reset block wdt_reset 44, and a counter block wdt_counter 48.

KEY DETECT BLOCK

The watchdog timer 10 supports two unique keyed sequences which are recognized by the key detect block wdt_keydet 42. In the disclosed embodiment, 3333h followed by CCCCh serves as a write key, and AAAAh followed by 5555H serves as a count-clear key. Any number of processor cycles, including memory and I/O reads and writes, may be inserted between the first data pattern of a key and the second data pattern of a key.

The write key is used to open a WDTCON register in the register control block wdt_regs 24. The WDTCON register includes a watchdog timer enable bit ENA. When the ENA bit is set to '1', the watchdog timer 10 is enabled. The ENA is set to '1' when the write key is detected. When the ENA bit is set to '0', the watchdog timer 10 is disabled. The key detect block wdt_keydet 42 provides a reg_write_all signal and a reg_write_flags signal to the WDTCON register. The watchdog timer register block wdt_regs 24 uses these signals to determine which bits are to be updated during a write. If a write has been previously detected which sets the ENA bit, the reg_write_flags signal is asserted. If a write bit has not been detected which sets the ENA bit since the last reset, the signal reg_write_all signal is asserted when the write key is detected. If neither the reg_write_all signal nor the reg_write flags signal is asserted, then no bits in the WDTCON register are updated. If the reg_write_flags signal is asserted, only an NMIFLAG bit and a RSTFLAG bit in the WDTCON register may be updated. In an emulator support mode according to the present invention, ICE MODE, if the reg_write_all signal is asserted, all the bits of the WDTCON register are open to updating. In the ICE MODE, the reg_write_all signal is deasserted on a next access to the WDTCON register. Also, in the ICE MODE, access to all bits of the WDTCON register is provided by assertion of the reg_write_all signal regardless of whether there is a previous enabling write.

Register select signals are generated by the wdt_regs block 24 and provided to the wdt_keydet block 42. Each register select signal is used to indicate when a particular register is visible based on the mode of operation of the watchdog timer 10. A key_WDTCON_wrsel signal corresponds to the watchdog timer control register WDTCON. A key_WDTCNTL_wrsel signal corresponds to the watchdog timer count low register. A key_WDTCNTH_wrsel signal corresponds to a watchdog timer count high register. A key_WDTRCNT_wrsel signal corresponds to a watchdog timer reset count register. The signals PCB_WR, PCB_AD, PCB_WR_DATA, and WDT_BLOCK_SEL are provided by the PCB bus controller 12 to the wdt_keydet block 42. The wdt_keydet block 42 is thereby used to control access to registers within the wdt_regs block 24.

The microcontroller C includes a system configuration (SYSCON) register 52 for setting an internal test mode, TEST MODE, or an emulator support mode according to the present invention, ICE MODE, for the watchdog timer 10. The SYSCON register 52 is shown in broken line to indicate that the SYSCON register 52 is external to the watchdog timer 10. The SYSCON register 52 includes a TEST_MODE bit 54 for providing a TEST_MODE signal to the wdt_keydet block 42. TEST MODE is set by asserting the TEST_MODE signal and deasserted by deasserting the TEST_MODE signal. The SYSCON register 52 also includes an ICE_MODE bit 56 for providing an ICE_MODE signal to the wdt_keydet block 42. ICE MODE is set or triggered by asserting the ICE_MODE signal and exited by deasserting the ICE_MODE signal. The ICE_MODE bit 56 may only be written if an external pin of the microcontroller C is pulled during a reset. In this way, the integrity of the watchdog timer 10 is maintained.

WATCHDOG REGISTER BLOCK

The watchdog timer 10 provides a normal operational mode, an internal test mode, and an emulator support mode according to the present invention. In the normal operational mode, the watchdog register block wdt_regs 24 uses the reg_write_all and the reg_write_flags signals to grant write access to the WDTCON register. In the emulator support mode, the reg_write_all signal is asserted when the write key is detected. The reg_write_flags signal is not asserted during the emulator support mode.

WatchDog Timer Control Register (WDTCON).

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Bit | ENA | WRST | RSTFLAG | NMIFLAG | RES | | | EXRST | ES | | | | | | | |
| R/W | R/W | R/W | R/W(0) | R/W(0) | R | R | R | R/W | R/W | R/W | R/W | R/W | R/W | R/W | R/W | R/W |
| Default | 1 | 1 | 0 | 0 | 0 | 0 | 0 | 1 | 1 | 0 | 0 | 0 | 0 | 0 | 0 | 0 |

In the disclosed embodiment, the watchdog timer control register WDTCON is a 16-bit register. Bit 15 is defined as the watchdog timer enable bit ENA. The ENA bit is a read/write bit having a default value of '1.' When the ENA bit is set to '1,' the watchdog timer 10 is enabled. When the ENA bit is set to '0', the watchdog timer 10 is disabled. Bit 14 is defined as a watchdog request signal WRST. The WRST bit is a read/write bit having a default value of '1.' When the WRST bit is set to '1,' the watchdog timer 10 generates a system reset when a watchdog timer time-out occurs. When the WRST bit is set to '0' and the NMIflag bit is set to '0,' the watchdog timer 10 generates an NMI when a watchdog timer time-out occurs. Bit 13 is defined as a reset flag bit RSTFLAG. The RSTFLAG bit is a read/write bit having a default value of '0.' When the RSTFLAG bit is set to '1,' a watchdog timer reset event has occurred. When the RSTFLAG bit is set to '0,' a watchdog timer reset event has not occurred. Further, the RSTFLAG bit may be cleared by software.

Bit 12 is defined as a NMIFLAG bit. The NMIFLAG bit is a read/write bit having a default value of '0.' When the NMIFLAG bit is set to '1,' a watchdog timer NMI event has occurred. If a watchdog timer time-out event occurs while the NMIFLAG bit is set, the watchdog timer 10 generates a system reset regardless of the setting of the WRST bit. When the NMIFLAG bit is set to '0,' a watchdog timer NMI event has not occurred. The NMIflag bit also may be cleared by software. In the disclosed embodiment, bits 11 through 9 are reserved. Bit 8 is defined as an external reset enable bit EXRST. The EXRST bit is a read/write bit having a default value of '1.' When the EXRST bit is set to '1,' the watchdog timer 10 generates an external reset signal whenever a watchdog timer reset event occurs. When the EXRST bit is set to '0,' an external signal has not been generated during watchdog timer resets. The EXRST bit is set by an externally generated reset and is not changed by a watchdog timer reset. Bits 7 through 0 are defined as an exponent select field ES. The ES bits are read/write bits. Bit 7 of the ES bits has a default value of '1' and bits 6 through 0 of the ES bits have a default value of '0.' The exponent select field ES determines the duration of the watchdog timer time-out interval. The watchdog timer exponent selections table provided below represents how different bit combinations of the exponent select field ES result in different time-out intervals.

| Bit 7 | Bit 6 | Bit 5 | Bit 4 | Bit 3 | Bit 2 | Bit 1 | Bit 0 | Exponent |
|-------|-------|-------|-------|-------|-------|-------|-------|----------|
| 0 | 0 | 0 | 0 | 0 | 0 | 0 | 0 | N/A |
| X | X | X | X | X | X | X | 1 | 10 |
| X | X | X | X | X | X | 1 | 0 | 20 |
| X | X | X | X | X | 1 | 0 | 0 | 21 |
| X | X | X | X | 1 | 0 | 0 | 0 | 22 |
| X | X | X | 1 | 0 | 0 | 0 | 0 | 23 |
| X | X | 1 | 0 | 0 | 0 | 0 | 0 | 24 |
| X | 1 | 0 | 0 | 0 | 0 | 0 | 0 | 25 |
| 1 | 0 | 0 | 0 | 0 | 0 | 0 | 0 | 26 |

The time-out duration is a function of an exponent and a frequency of a central processing unit core in the microcontroller C. The equation for calculating the time-out duration follows:

$$\text{Time-out Duration} = 2^{Exponent} / \text{CPU frequency}.$$

With this equation, time-out duration is the time-out period for the watchdog timer 10 in seconds. Exponent is the value given from the table above, and CPU frequency is the operating speed of the CPU in Hertz (Hz).

WATCHDOG COUNTER BLOCK

Various signals are provided between the watchdog counter block wdt_counter 48 and the watchdog register block wdt_regs 24. A cnt_enable signal is provided from the register block wdt_regs 24 to the counter block wdt_counter 48. The cnt_enable signal is asserted when the ENA bit in the WDTCON register is set and the ICE_MODE bit 56 of the SYSCON register 52 is not set. The cnt_enable signal is used by the counter block wdt_counter 48 to enable a watchdog timer current counter WDTCNT 50. The watchdog timer current counter 50 represents the current count of the watchdog timer 10. The current count is increased once for every PH1 clock cycle while the cnt-enable signal is asserted. The current count is cleared if a cnt_reset signal is asserted indicating that the count clear key has been detected or that a write which enabled the timer 10 has just occurred. The current count is also cleared if the counter 50 matches a compare value and a rst_timeout signal provided by the counter block wdt_counter 48 to the reset block wdt_reset 44 is asserted. The rst_timeout signal is generated when a bit is set in the watchdog timer current counter WDTCNT 50 that is also set in the ES field of the WDTCON register. Multiple cnt_exp signals are used to pass the value of the ES field and the WDTCON register to the counter block 48 wdt_counter. An additional event causing the current count to be cleared is the assertion of the RST signal. The current count is provided from the counter block 48 to the register block wdt_regs 24 as a reg_count signal.

A cnt_newcount bus for containing a new count is provided from the register block 24 to the counter block 48 wdt_counter. In the disclosed embodiment, the cnt_new count bus is 16 bits. A cnt_load_count_low signal is used to load data from the cnt_new count bus into the lower 16 bits of the watchdog timer current counter WDTCNT 50. The cnt_load_count_high signal is used to load data from the cnt_new_count bus into bits 26:16 of the watchdog timer current counter WDTCNT 50.

| WatchDog Timer Count Low Register (WDTCNTL). | | | | | | | |
|---|---|---|---|---|---|---|---|
| 15 | 14 | 13 | 12 | 11 | 10 | 9 | 8 |
| Bit | | | COUNTL | | | | |
| R/W | R/W | R/W | R/W | R/W | R/W | R/W | R/W |
| Default 0 | 0 | 0 | 0 | 0 | 0 | 0 | 0 |
| 7 | 6 | 5 | 4 | 3 | 2 | 1 | 0 |
| Bit | | | COUNTL | | | | |
| R/W | R/W | R/W | R/W | R/W | R/W | R/W | R/W |
| Default 0 | 0 | 0 | 0 | 0 | 0 | 0 | 0 |

The watchdog timer 10 is readable and writable through the watchdog timer count low register WDTCNTL and the watchdog timer count high register WDTCNTH. In the disclosed embodiment, the watchdog timer count low register WDTCNTL is a 16-bit register defining a COUNTL field. Also, in the disclosed embodiment, the COUNTL field is the 16 least significant bits of the watchdog timer current counter WDTCNT 50. If the ICE_MODE bit 56 is set, the WDTCNTL register is available. The WDTCNTL register may only be written following a write key to the WDTCON register. The value of the COUNTL field is automatically reset when the watchdog timer 10 is enabled. The COUNTL field is reset by writing a write key to the WDTCON register.

| WatchDog Timer Count High Register (WDTCNTH). | | | | | | | |
|---|---|---|---|---|---|---|---|
| 15 | 14 | 13 | 12 | 11 | 10 | 9 | 8 |
| BIT | | | RESERVED | | | | |
| R/W | R | R | R | R | R | R/W | R/W | R/W |
| Default 0 | 0 | 0 | 0 | 0 | 0 | 0 | 0 |
| 7 | 6 | 5 | 4 | 3 | 2 | 1 | 0 |
| BIT | | | COUNTL | | | | |
| R/W | R/W | R/W | R/W | R/W | R/W | R/W | R/W |
| Default 0 | 0 | 0 | 0 | 0 | 0 | 0 | 0 |

In the disclosed embodiment, the watchdog timer count high register WDTCNTH is a 16-bit register. Bits 11 through 15, which are read-only, are preferably reserved. Bits 0 through 10 represent the COUNTH field. The bits within the COUNTH field are readable and writable. The default value for each bit within the COUNTH field is '0.' If the ICE_MODE bit 56 is set, the WDTCNTH register is available. The WDTCNTH register may only be written following a write of the write key to the WDTCON register. The value of the COUNTH field is automatically reset when the watchdog timer 10 is enabled. In a normal operation mode, the COUNTH field is reset by writing a write key to the WDTCON register. In the disclosed embodiment, the COUNTH field is the eleven most significant bits of the watchdog timer current counter WDTCNT 50.

| WatchDog Timer Reset Count Register (WDTRCNT). | | | | | | | |
|---|---|---|---|---|---|---|---|
| 7 | 6 | 5 | 4 | 3 | 2 | 1 | 0 |
| Bit | | | RCOUNT | | | | |
| R/W | W | W | W | W | W | W | W | W |
| Default 0 | 0 | 0 | 0 | 0 | 0 | 0 | 0 |

-continued

WatchDog Timer Reset Count Register (WDTRCNT).

| | 15 | 14 | 13 | 12 | 11 | 10 | 9 | 8 |
|---|---|---|---|---|---|---|---|---|
| Bit | | | | RCOUNT | | | | |
| R/W | W | W | W | W | W | W | W | W |
| Default | 0 | 0 | 0 | 0 | 0 | 0 | 0 | 0 |

In the disclosed embodiment, the watchdog timer reset count register WDTRCNT is a 16-bit register. Each bit of the WDTRCNT register is writable and has a default value of '0.' Bits 15 through 0 of the WDTRCNT register define the RCOUNT field. In the disclosed embodiment, the RCOUNT field contains the one's compliment of the number of processor clocks for which the RST signal should be asserted during a watchdog timer reset.

WATCHDOG RESET CONTROL BLOCK

Various signals are provided between the watchdog register block wdt_regs 24 and the watchdog reset control block wdt_reset 44. A reg_setnmi signal and a reg_setrst signal are provided from the reset block wdt_reset 44 to the register block wdt_regs 24. The reg_setnmi signal is asserted to indicate that a watchdog timer NMI has occurred. The reg_setnmi signal causes the NMIFLAG bit to be set. The reg_setrst signal is asserted to indicate that a watchdog timer reset event has occurred. The reg_setrst signal causes the RSTFLAG bit to be set.

When reg_setrst signal is not asserted and the RST signal is asserted, each bit of the WDTCON register is placed in a reset condition. When both the RST signal and reg_setrst signal are asserted, each bit of the WDTCON register except the RSTFLAG and EXRST bits is placed in a reset condition. A rst_do_reset signal is provided from the register block wdt_regs 24 to the reset block wdt_reset 44. The rst_do_reset signal is asserted when the WRST bit of the WDTCON register is set or when the NMIFLAG bit of the WDTCON register is set. When the rst_do_reset signal is asserted, the reset control block wdt_regs 24 performs a reset, rather than an NMI when the watchdog timer 10 times out. The watchdog reset block 44 also receives the signal rst_timeout signal from the watchdog counter block wdt_counter 48. The rst_timeout signal indicates to the wdt_reset block 44 that a watchdog timer time-out has occurred. The wdt_rst block 44 includes a wdt_rst_counter sub-block 46. The wdt_rst_counter sub-block 46 contains a counter used to time the duration of a watchdog timer reset.

A traditional method of debugging an embedded system or other microcontroller-based device is to use an in-circuit emulator. To facilitate in-circuit emulation of code in a microcontroller-based device, breakpoints are commonly set throughout watchdog timer code to be executed on the microcontroller. Once enabled, a conventional watchdog timer became read-only and could not be disabled or reconfigured. The occurrence of a watchdog time-out which does not indicate that a watchdog time-out event has occurred disrupts code execution. A watchdog time-out is particularly undesirable during an emulation mode of a microcontroller-based device since the state of the device during an emulation mode is ill-suited to processing a watchdog time-out. Further, refreshing of a watchdog timer by emulator code undesirably masks to the user whether the watchdog timer code is refreshing the watchdog timer with sufficient frequency to prevent a watchdog time-out. The resets to the watchdog timer defined within the watchdog timer code have not occurred or have occurred prematurely depending on the location of breakpoints within the watchdog timer code and the duration of the execution of emulator code following the breakpoints.

A system according to the present invention eliminates the need to reset a watchdog timer with emulator code by decoupling the timing of the watchdog timer 10 from emulator code execution. An emulator support mode in accordance with the present invention causes all bits of the WDTCON register to be writable regardless of whether the ENA bit has been set by software, allowing an emulator to disable the watchdog timer 10 if desired. The present invention thus allows an in-circuit emulator to be effectively used with watchdog timer code.

In an effort to predict how a microcontroller-based device may behave prior to a watchdog time-out, a user has typically set a watchdog timer for a short time-out period and then observed the effect upon the device. The user then extrapolates that effect in an attempt to predict how the device might react prior to the watchdog time-out. This conventional approach has yielded significant inaccuracies that pose a high degree of software debug uncertainty.

A system according to the present invention provides an improved approach for testing a device's handling of watchdog time-outs. In an emulator support mode in accordance with the present invention, the WDTCNTL and WDTCNTH registers become readable and writable, allowing an emulator to read the current count and to set it to a specific value for use in testing handling of watchdog time-outs by the microcontroller-based device. In a conventional watchdog timer, it has not been possible to read a current count.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A watchdog timer having an emulator support mode for disabling watchdog time-outs, comprising:
   a watchdog timer core;
   a watchdog timer control register for controlling timing for the watchdog timer core; and
   write enable logic for disabling writes to the watchdog timer control register in a normal operational mode subsequent to a write asserting an enable bit of the watchdog timer control register and enabling writes to the watchdog timer control register in the emulator support mode subsequent to a write asserting the enable bit.

2. The watchdog timer of claim 1, the write enable logic comprising:
   key detect logic for asserting a global register signal provided to the watchdog timer control register in the emulator support mode responsive to detection of a write key and deasserting the global register signal and a flag register signal on the next access to the watchdog timer control register.

3. The watchdog timer of claim 1, further comprising:
   emulator support mode detection logic for detecting the emulator support mode and providing an emulator support mode signal to the write enable logic when the emulator support mode is detected.

4. The watchdog timer of claim 1, further comprising:
   count disable logic for deasserting the count enable signal to disable counting by the watchdog timer control register.

5. A watchdog timer having an emulator support for reconfiguring watchdog time-outs, comprising:
   a watchdog timer core;
   a watchdog timer current counter for indicating a current count of the watchdog timer core; and
   current count logic for controlling the watchdog timer current counter, the current count logic being non-readable and non-programmable in a normal operational mode and being readable and programmable in an emulator support mode.

6. The watchdog timer of claim 5, the current count logic comprising:
   a watchdog timer count low register readable and writable in the emulator support mode; and
   a watchdog timer count high register readable and writable in the emulator support mode.

7. The watchdog timer of claim 5, further comprising:
   emulator support mode detection logic for detecting the emulator support mode and providing an emulator support mode signal to the current count logic when the emulator support mode is detected.

8. A microcontroller having emulation support for disabling watchdog time-outs, comprising:
   a microprocessor core;
   a watchdog timer, comprising:
      a watchdog timer control register controlling timing for the watchdog timer; and
      write enable logic for disabling writes to the watchdog timer control register in a normal operational mode subsequent to a write asserting an enable bit of the watchdog timer control register and enabling writes to the watchdog timer control register subsequent to a write asserting the enable bit in the emulator support mode.

9. The microcontroller of claim 8, the write enable logic comprising:
   key detect logic for asserting a global register signal to the watchdog timer control register in the emulator support mode responsive to detection of a write key and deasserting the global register signal on the next access to the watchdog timer control register.

10. The microcontroller of claim 8, the watchdog timer further comprising:
    count disable logic for deasserting the count enable signal to disable counting by the watchdog timer control register.

11. The microcontroller of claim 8, the watchdog timer further comprising:
    emulator support mode detection logic for detecting the emulator support mode and providing an emulator support mode signal to write enable logic when the emulator support mode is detected.

12. A microcontroller having emulator support for reconfiguring watchdog time-outs, comprising:
    a microprocessor core;
    a watchdog timer, comprising:
       a watchdog timer current counter for indicating a current count of the watchdog timer; and
       current count logic for controlling the watchdog timer current counter, the current count logic being non-readable and non-programmable in a normal operational mode and being readable and programmable in an emulator support mode.

13. The microcontroller of claim 12, the current count logic comprising:
    a watchdog timer count low register readable and writable in the emulator support mode; and
    a watchdog timer count high register readable and writable in the emulator support mode.

14. The microcontroller of claim 12, the watchdog timer further comprising:
    emulator support mode detection logic for detecting the emulator support mode and providing an emulator support mode signal to the current count logic if the emulator support mode is detected.

15. The microcontroller of claim 14, further comprising:
    emulator support mode triggering logic for triggering entry and exit for the emulator support mode.

16. The microcontroller of claim 15, the emulator support mode triggering logic comprising:
    an emulator support mode bit for providing an emulator support mode signal to the emulator support mode detection logic.

17. The microcontroller of claim 15, wherein the emulator support mode triggering logic is only writable if an external pin of the microcontroller is pulled during a reset.

18. A method of decoupling the timing of a watchdog timer from code execution by an emulator, comprising the steps of:
    detecting an indication to enter an emulator support mode of the watchdog timer; and
    entering an emulator support mode for inhibiting the watchdog timer from counting.

19. The method of claim 18, the watchdog timer including a current count counter, the step of entering an emulator support mode comprising the step of:
    deasserting a count enable signal to disable the current count counter from counting in the emulator support mode.

20. The method of claim 18, further comprising the steps of:
    detecting an indication to exit the emulator support mode; and
    exiting the emulator support mode to restart counting by the watchdog timer.

21. A method of reconfiguring a watchdog time-out of a watchdog timer, comprising the steps of:
    placing the watchdog timer in an emulator support mode, a current count of the watchdog timer being programmable in the emulator support mode; and
    programming the current count of the watchdog timer.

22. The method of claim 21, the watchdog timer including a watchdog timer count high register and a watchdog timer count low register, the step of programming the current count comprising the step of:
    reading the watchdog timer count high register and the watchdog timer count low register.

23. The method of claim 21, the watchdog timer including a watchdog timer count high register and a watchdog timer count low register, the step of programming the current count comprising the step of:
    writing to the watchdog timer count high register and the watchdog timer count low register.

* * * * *